3,046,262
ACCELERATED ANAEROBIC CURING
COMPOSITIONS
Vernon K. Krieble, % The American Sealants Co.,
103 Woodbine St., Hartford, Conn.
No Drawing. Filed Aug. 19, 1960, Ser. No. 50,594
6 Claims. (Cl. 260—89.5)

The present invention relates to anaerobic curing compositions utilizing polymerizable compounds having the following general formula:

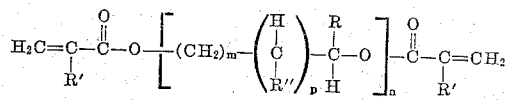

where R is a member selected from the class consisting of hydrogen, —CH$_3$, —C$_2$H$_5$, —CH$_2$OH, and

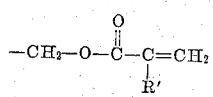

radicals, R' is a member selected from the class consisting of hydrogen, chlorine and methyl and ethyl radicals, R'' is a member selected from the class consisting of hydrogen, —OH radical, and

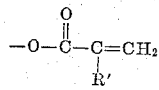

radical; $m$ is an integer equal to a least 1, e.g., from 1 to 8 or higher, for instance, from 1 to 4, inclusive; $n$ is an integer equal to at least 1, for example, 1 to 20 or more; and $p$ is one of the following: 0, 1.

In my United States Patent No. 2,895,950, issued July 21, 1959, I have disclosed an anaerobic curing composition utilizing monomers within the foregoing formula which polymerize to the solid state in the presence of certain organic hydroperoxide catalysts rapidly and spontaneously upon the exclusion of air or oxygen from the composition. In addition to anaerobic curing characteristics, my patented compositions provide the additional advantage of long shelf life in the liquid state so long as contact with air is maintained, which feature is particularly useful in the bonding or adhering of adjacent surfaces since the composition can be stored or permitted to stand in contact with air for extended periods of time without polymerization. However, when it is deposited or placed between adjacent surfaces, the resulting exclusion of air produces polymerization of the composition to form a strong bond between the adjacent surfaces.

As stated in my aforementioned patent, conventional accelerators such as tertiary amines, ascorbic acid, organic phosphites and quaternary ammonium salts may be included to reduce the amount of hydroperoxide catalyst required or to enable use of catalysts having a lesser percentage of oxygenation. Such accelerators have proven beneficial in practice and have been extensively used.

However, an increasing desire for even more rapid setting adhesives in assembly-line fabrication has created an intense need for compositions which anaerobically cure to a satisfactory bond within as short a period as possible, which need has not been fully met by use of my patented compositions containing conventional accelerators. It has also been desired that an anaerobically curing composition be developed to provide rapid curing at room temperatures rather than by use of elevated temperatures.

It is an aim of the present invention to provide an anaerobically curing composition which will set very rapidly in the absence of air to form a strong bond between adjacent surfaces. It is also an aim of the present invention to provide such a rapid curing composition which is stable for extended periods of time in the presence of moderate amounts of air or oxygen.

I have now found that the anaerobic polymerization of substantially unoxygenated monomers corresponding to the formula:

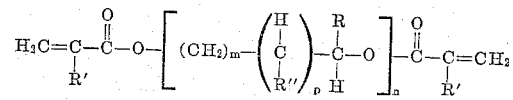

wherein R, R', R'', $m$, $n$, and $p$ have the meanings heretofore set forth, in the presence of a catalyst can be greatly accelerated by the addition of a small amount of an accelerator selected from the group consisting of imides, formamide, and combinations thereof. By use of these accelerators, not only the organic hydroperoxide catalysts of my patented composition but also the entire broader class of organic peroxides and hydrogen peroxide can be utilized to provide a rapid anaerobic curing composition. The preferred compositions of the present invention not only provide this greatly accelerated anaerobic curing characteristic but also evidence good shelf stability in the presence of moderate amounts of air or oxygen; i.e., they remain liquid for extended periods of time.

The term "unoxygenated" as used herein and in the claims refers to unmodified monomers corresponding to the above formula as distinguished from the "oxygenated" monomers of United States Patent No. 2,628,178 which are prepared by passing oxygen through the monomer for an extended period of time.

Exemplary of the monomers which may be utilized in the compositions of the present invention are the following: Diethylene glycol dimethacrylate, triethylene glycol dimethacrylate, tetraethylene glycol dimethacrylate, dipropylene glycol dimethacrylate, polyethylene glycol dimethacrylate, di-(pentamethylene glycol) dimethacrylate, tetraethylene glycol diacrylate, tetraethylene glycol di-(chloroacrylate), diglycerol diacrylate, diglycerol tetramethacrylate, tetramethylene dimethacrylate and ethylene dimethacrylate. The foregoing monomers need not be in the pure state but may comprise commercial grade in which inhibitors or stabilizers are included. As in my aforementioned patent, it is within the scope of the present invention to obtain modified characteristics for the cured composition by the utilization of one or more monomers within the above formula with other unsaturated monomers such as unsaturated hydrocarbons or unsaturated esters.

In my aforementioned patent, I have described and claimed the use of certain non-polymerizing organic hydroperoxides in which the atoms directly linked to the carbon atom bearing the hydroperoxide radical are selected from the group consisting of carbon, hydrogen, nitrogen or oxygen, and, in such cases where all of the said directly linked atoms are carbon, not more than two of said carbon atoms comprise the carbon atom of a methyl group. Some of these hydroperoxide catalysts may be produced readily by direct substitution, and others are produced by oxygenation of compounds in the liquid phase, particularly by passing oxygen or an oxygen-containing gas through the compounds, preferably ethers, ketones and hydrocarbons. These catalysts have been found to be latent initiators of polymerization of the aforesaid monomers and their mixture with the monomer is highly sensitive to contact with air so that the catalyst remains inactive or ineffective in the presence of oxygen but upon exclusion therefrom will initiate polymerization of the monomer. Further details concerning the preparaton and specific examples of such hydroperoxide catalysts can be readily obtained from the specification of my aforementioned patent.

In addition to the organic hydroperoxide catalysts of my patented composition, I have found that hydrogen peroxide and the broader class of organic peroxides (which includes the hydroperoxides) can be utilized in the present invention to provide a greatly accelerated anaerobic curing composition. However, for the purposes of the present invention, the preferred catalysts are the organic hydroperoxides which substantially universally provide a composition having extended shelf life in the presence of air or oxygen. Additionally, it has been found that other organic peroxide catalysts will evidence extended shelf life characteristics in the presence of the accelerators of the present invention while also providing rapid anaerobic curing.

As specific examples of catalysts other than those encompassed by my aforementioned patent are the following: hydrogen peroxide, benzoyl peroxide and tertiary butyl perbenzoate.

Although as little as 0.1 percent by weight of catalyst may be employed, it is preferable to utilize about 0.5 to 5.0 percent by weight for optimum speed in curing and most desirable storage characteristics. Amounts in excess of 10 percent by weight produce no additional beneficial effect and have a tendency to act as a diluent for the cured composition. As will readily be appreciated, the amount of catalyst necessary to obtain optimum curing will generally decrease as the amount of accelerator is increased.

The imide and formamide accelerators of the present invention provide increased activity even in trace amounts and may be utilized in amounts up to saturation, but generally about 0.05 to 5.0 percent by weight is conveniently utilized and preferably 0.1 to 2.0 percent by weight, depending upon activity and solubility. Exemplary of the various accelerators of the present invention are benzoic sulfimide, succinimide, phthalimide, formamide, N-substituted formamides such as N-ethyl formamide, and the metallic salts of the imides such as sodium saccharin.

Of the various accelerators, the sulfimides, having the following general formula:

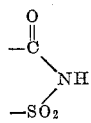

have proven to be most preferable in that they not only provide greatly accelerated curing characteristics but also enable the provision of compositions which exhibit excellent shelf stability over extended periods of time. The metallic salts of the sulfimides are also highly effective as an accelerator but exhibit poor shelf stability, and so organic sulfimides rather than metallic sulfimide salts are preferred. Of the sulfimides, benzoic sulfimide has proven most beneficial in that it not only provides optimum acceleration but good shelf stability and is, therefore, the preferred accelerating agent. The addition of amine accelerators to the sulfimides provides no significant advantage in terms of activity and greatly reduces shelf life so that amines should be excluded from sulfimide mixtures when shelf life is desired.

Formamide and its N-substituted derivatives provide desirable acceleration characteristics for the composition, and very great activity in combination with amine accelerators, but have the deficiency of reduction in effectiveness during storage. Thus, formamide in combination with amine accelerators such as benzylamine and triethylamine is a highly effective accelerating agent for compositions which are to be applied within relatively short times after formulation.

Succinimide has also proven to be a suitable accelerator and is particularly active in combination with amine accelerators, although compositions made therewith oftentimes fail to provide continuing shelf stability so that it is preferably used in compositions designed for application within a relatively short time after formulation. Phthalimide is the least active of the accelerators of the present invention, but has not been noted to reduce the shelf stability of the compositions.

As previously stated, conventional amine accelerators in combination with formamide and succinimide provide greatly increased activity. Generally 0.5 to 5.0 percent by weight of amines such as triethylamine and tripropylamine and benzylamine are suitable for this purpose. However, amines should be excluded from sulfimide formulations if shelf stability is desired.

Indicative of the efficacy of even small amounts of the accelerators of the present invention are the data set forth in Table I, wherein the amounts of benzoic sulfimide and cumene hydroperoxide catalyst added to tetraethylene glycol dimethacrylate monomer were varied as indicated. A few drops of the several mixtures were placed on the threads of ⅜ inch nuts and bolts which were then tightened and allowed to stand at room temperature for two hours, after which the prevailing torque was determined, which test will be described in detail hereinafter.

TABLE I

| Cumene Hydroperoxide, Percent by Weight | Benzoic Sulfimide, Percent by Weight | Prevailing Torque, Foot Pounds |
|---|---|---|
| 0.5 | 0.1 | 3½ |
| 1.0 | 0.1 | 16 |
| 4.0 | 0.1 | 21 |
| 1.0 | 0.05 | 3 |
| 2.0 | 0.05 | 4 |
| 4.0 | 0.05 | 6 |
| 2.0 | 0.0 | 0.5 |

It has also been found that the fastest curing compositions are those utilizing batches of monomer with appreciable acid numbers, particularly when using formamide accelerators.

As a preferred composition of the present invention, the following has provided excellent accelerated curing characteristics together with extended shelf stability in the presence of moderate amounts of air in polyethylene bottles:

Percent by weight
Tetraethylene glycol dimethacrylate _____ 97.7
Cumene hydroperoxide _____ 2.0
Benzoic sulfimide _____ 0.3

The several components of the composition may be mixed at ambient temperatures and at a time in advance of the actual use of the composition, the amount of time depending upon the accelerator and catalyst selected. The preferred compositions may be mixed months and even years in advance of use and stored without any sign of gelling. So long as some air or oxygen is present, the material will not polymerize upon storage for appreciable lengths of time, which shelf life may be further assured and enhanced by the addition of small amounts of an inhibitor. This quantum of air may be provided by a small volume of air in a properly shaped container, preferably of polyethylene or a similar material which permits the passage of air therethrough. Upon exclusion from air, the composition rapidly polymerizes to form a strong bond, which polymerization can be even further accelerated by use of elevated temperatures, although such is not necessary in general practice.

The compositions of the present invention are nonvolatile and may be varied in viscosity by means of the particular monomer selected and by use of thickening agents. Generally, it is desired to have a thin liquid of low viscosity exhibiting good capillary action for purposes of bonding closely fitting surfaces or for bonding previously assembled parts by penetration of the sealant composition between the mating surfaces. However, for loose-fitting surfaces or for filling large spaces or voids, sealant compositions of high viscosity are preferable.

Small amounts of the compositions of the present invention will generally be sufficient to bond mating surfaces, as, for example, a few drops of the composition applied to the cooperating threads of a nut and bolt. Preferably the surfaces should be free from grease or contamination prior to application of the sealant composition. The accelerated compositions of the present invention will produce such strong bonds that it may be desirable to reduce the shear strength produced by the mixture through the incorporation of suitable diluents for use on softer metals, such as aluminum and copper, or when the engagement ratio is high.

As in the instance of my heretofore-identified patent, the compositions may be applied by penetration between the mating surfaces through capillary action or by coating the parts in advance of assembly by tumbling or spraying. While the compositions of the present invention will be catalyzed in their cure by most metals, certain metals, notably cadmium and zinc, do not always have the catalytic effect, and it is preferred to pretreat the surfaces of one of the mating surfaces with a heavy metal compound which is soluble in the monomer-catalyst mixture, such as ferric chloride and cobalt, manganese, lead, copper and iron soaps. Specific examples of such compounds are set forth in my previously identified patent.

As a measure of the activity of the formulated composition, several simple tests are available. In one test, several drops of the admixture may be placed between two elongate plates of glass or metal, or of glass and metal, preferably at right angles to each other. When it is possible to move the two plates as a unit by manipulating one of the plates, it is evident that polymerization has taken place. In general, such a degree of polymerization within several hours is satisfactory for most purposes, although longer periods are permissible for some applications where bond strength is not required immediately. A more quantitative test is provided by subjecting the plates to shear stress to determine the shear strength of the bond.

In another test, the strength of the bond between threaded members is determined by placing several drops of the sealant in the mating threads of a nut and bolt, tightening the nut to a predetermined torque, and allowing the sealant to set and cure, generally at room temperature. In some instances, the break-loose torque is noted, but more conventionally the prevailing torque is the measure of bond strength. To obtain the prevailing torque for the bond, the torque required to turn the bolt or screw at several, usually four or five, points after the break-loose torque and up to one full turn are averaged. For example, the torques required at ¼, ½, ¾ and 1 turn are taken and averaged. Commercially, a bolt adhesive developing a prevailing torque of one foot pound on ⅜ inch full nut is considered satisfactory.

Illustrative of the efficacy of the present invention are the following specific examples.

*Example 1*

A mixture of tetraethylene glycol dimethacrylate and 2.0 percent by weight of cumene hydroperoxide was divided into two batches. To one batch was added 0.3 percent by weight of benzoic sulfimide.

Two groups of specimens were prepared by placing a few drops of the mixtures on the threads of ⅜ inch nuts and bolts, and then tightening to a predetermined torque. After varying periods of time at room temperature, the prevailing torques developed by the mixtures were determined, and the test data is reported in Table II below.

TABLE II

| Time, Hours | Prevailing Torque, Foot Pounds | |
|---|---|---|
| | With Accelerator | Without Accelerator |
| 2 | 16½ | |
| 3 | 19¾ | 1 |
| 4 | 25 | 13½ |
| 6 | 25 | 22⅓ |

As is readily apparent from the above table, the bolts and nuts treated with the mixture containing the imide accelerator produced excellent adhesion even after only a short period of time at room temperature.

*Example 2*

To tetraethylene glycol dimethacrylate was added 1.0 percent by weight hydrogen peroxide (90 percent by weight). After forty-two hours, there was no evidence of adhesion between ⅜ inch nuts and bolts which had been treated with several drops of the mixture.

To a separate specimen of tetraethylene glycol dimethacrylate were added 1.0 percent by weight hydrogen peroxide, 4.0 percent benzoic sulfimide and 0.5 percent acetic anhydride. A few drops of the mixture were placed upon the threads of a ⅜ inch nut and bolt. At the end of four hours at room temperature, the prevailing torque was 6 foot pounds, and, at the end of six hours at room temperature, the prevailing torque was 11 foot pounds. This composition has been stored for one year without evidence of gelling.

To another specimen of tetraethylene glycol dimethacrylate containing a small amount of inhibitor were added 3.0 percent by weight hydrogen peroxide and 2.0 percent by weight benzoic sulfimide. A few drops were placed on the threads of ⅜ inch nuts and bolts and, at the end of two hours, the prevailing torque was 5 foot pounds. At the end of three hours, the prevailing torque was found to be 12 foot pounds. This composition has been stored for over five months without evidence of gelling.

*Example 3*

To tetraethylene glycol dimethacrylate were added 7.0 percent by weight of cumene hydroperoxide and 2.0 percent by weight formamide. A few drops were placed upon the threads of ⅜ inch nuts and bolts which then were tightened and allowed to set at room temperature. After one and one half hours, the prevailing torque was found to be 6 foot pounds.

Upon storing the mixture for over two weeks, a prevailing torque of only 3 foot pounds was developed after one and one half hours, indicating somewhat of a loss in effectiveness after storage.

To a separate batch of tetraethylene glycol dimethacrylate were added 7.0 percent by weight of cumene hydroperoxide and 2.0 percent by weight N-ethyl formamide. A few drops of this mixture on the threads of ⅜ inch nuts and bolts produced a prevailing torque of 1½ foot pounds after one and one half hours.

*Example 4*

To tetraethylene glycol dimethacrylate were added 0.30 percent by weight benzoic sulfimide and 2.0 percent by weight methyl ethyl ketone hydroperoxide. A few drops of the mixture were placed on ⅜ inch bolts and nuts which were then tightened. After two hours at room temperature, the prevailing torque was found to be 15 foot pounds. This composition has been stored for over six months without evidence of gelling.

*Example 5*

To tetraethylene glycol dimethacrylate was added 2.0 percent by weight benzoyl peroxide. To a separate portion of this mixture was added 2.0 percent by weight benzoic sulfimide.

Two groups of specimens were prepared by placing a few drops of the mixtures on the threads of 3/8 inch nuts and bolts which were then tightened and allowed to set at room temperature for forty-eight hours. The bolts treated with the first mixture containing no benzoic sulfimide evidenced no adhesion, whereas the bolts treated with the second mixture containing benzoic sulfimide produced a prevailing torque of 24 foot pounds.

*Example 6*

To ethylene diacrylate were added 2.0 percent by weight cumene hydroperoxide and 0.30 percent by weight benzoic sulfimide. A few drops of the mixture placed on the threads of 3/8 inch nuts and bolts produced a prevailing torque of 21 foot pounds at the end of three hours.

*Example 7*

To tetraethylene glycol dimethacrylate was added 7.0 percent by weight cumene hydroperoxide. A few drops of this mixture produced a prevailing torque on 3/8 inch nuts and bolts of 8½ foot pounds at the end of six hours.

Upon saturation of this mixture with phthalimide (somewhat less than 2.0 percent by weight), a prevailing torque of 10 foot pounds was obtained at the end of six hours at room temperature.

*Example 8*

To tetramethylene dimethacrylate were added 2.0 percent by weight cumene hydroperoxide and 0.30 percent by weight benzoic sulfimide. A few drops of the mixture placed on the threads of 3/8 inch nuts and bolts produced a prevailing torque of 1 foot pound at the end of three hours, and 17 foot pounds at the end of forty-eight hours. The mixture has been stored for over two and a half months without gelling.

*Example 9*

To tetraethylene glycol dimethacrylate were added 2.0 percent by weight cumene hydroperoxide and 0.10 percent by weight benzoic sulfimide. A few drops of the mixture were placed on the threads of 3/8 inch nuts and bolts which were then tightened and allowed to stand at room temperature. At the end of two hours, the prevailing torque was 11⅓ foot pounds, and, at the end of twenty hours, the prevailing torque was 19 foot pounds. This mixture has been stored for over six months without evidence of gelling.

*Example 10*

To one batch of tetraethylene glycol dimethacrylate were added 7.0 percent by weight cumene hydroperoxide and 2.0 percent by weight formamide. To a second batch of the monomer were added the same components together with 2.0 percent by weight of benzylamine. To a third batch of the monomer were added 7.0 percent by weight cumene hydroperoxide and 2.0 percent by weight of benzylamine.

The threads of three groups of 3/8 inch bolts and nuts were treated with a few drops of the various mixtures, tightened and allowed to set at room temperature.

The bolts treated with the first mixture developed a prevailing torque of ½ foot pound at the end of one hour, 8 foot pounds at the end of two hours, and 13½ foot pounds at the end of three hours. The bolts treated with the formamidebenzylamine accelerator mixture developed a prevailing torque of 19 foot pounds after only one hour. The bolts treated with the third mixture utilizing only an amine accelerator developed a prevailing torque of 7 foot pounds at the end of one hour and 7½ foot pounds at the end of two hours.

*Example 11*

To tetraethylene glycol dimethacrylate was added 2.0 percent by weight of cumene hydroperoxide, and then sodium saccharin to saturation (somewhat less than 2.0 percent by weight).

A few drops of this mixture applied to the threads of 3/8 inch nuts and bolts developed a prevailing torque of 11 foot pounds after one hour at room temperature.

*Example 12*

A mixture of tetraethylene glycol dimethacrylate, 7.0 percent by weight of cumene hydroperoxide and 2.0 percent by weight triethylamine produced only 5½ foot pounds on 3/8 inch bolts and nuts at room temperature after three hours.

This mixture additionally containing 2.0 percent by weight succinimide produced a prevailing torque of 10 foot pounds after three hours.

As will be readily apparent from the foregoing detailed specification and specific examples, the present invention provides a greatly accelerated anaerobic curing composition as well as enables the use of compounds heretofore not feasible in the formulation of anaerobic curing compositions. Although the examples specifically deal with room temperature curing of the compositions, elevated temperatures may also be employed to further accelerate polymerization.

I claim:

1. A sealant composition having extended shelf life when exposed to oxygen but capable of rapidly setting upon exclusion from contact with oxygen comprising a mixture of an unoxygenated monomer corresponding to the general formula:

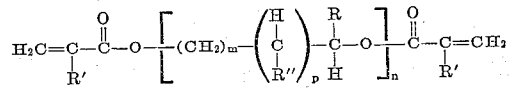

wherein R is a member selected from the class consisting of hydrogen, $-CH_3$, $-C_2H_5$, $-CH_2OH$,

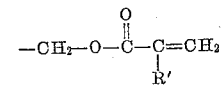

R' is a member selected from the class consisting of hydrogen, chlorine, $-CH_3$ and $-C_2H_5$, R'' is a member selected from the class consisting of hydrogen, $-OH$ and

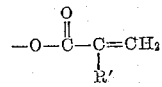

$m$ is an integer equal to at least 1, $n$ is an integer equal to at least 1, for example 1-20 or more, and $p$ is one of the following: 0, 1; 0.1-10.0 percent by weight of a catalyst selected from the group consisting of hydrogen peroxide and organic hydroperoxides, said catalyst being characterized by its inability to remain ineffective to polymerize said monomer in the presence of oxygen and to initiate polymerization of said monomer in the absence of oxygen at room temperature; and 0.01-10.0 percent by weight of an organic sulfimide, said composition being free from amines.

2. A sealant composition in accordance with claim 1, wherein said catalyst is an organic hydroperoxide.

3. A sealant composition in accordance with claim 1, wherein said catalyst is hydrogen peroxide.

4. A sealant composition in accordance with claim 1, wherein said sulfimide is benzoic sulfimide.

5. A sealant composition having extended shelf life when exposed to oxygen but capable of rapidly setting upon exclusion from contact with oxygen comprising a mixture of an unoxygenated monomer corresponding to the general formula:

wherein R is a member selected from the class consisting of hydrogen, —CH$_3$, —C$_2$H$_5$, —CH$_2$OH,

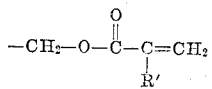

R′ is a member selected from the class consisting of hydrogen, chlorine, —CH$_3$ and —C$_2$H$_5$, R″ is a member selected from the class consisting of hydrogen, —OH and

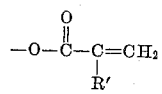

$m$ is an integer equal to at least 1, $n$ is an integer equal to at least 1, for example 1–20 or more, and $p$ is one of the following: 0, 1; 0.1–10.0 percent by weight of an organic hydroperoxide catalyst, said catalyst being characterized by its inability to remain ineffective to polymerize said monomer in the presence of oxygen and to initiate polymerization of said monomer in the absence of oxygen at room temperature; and 0.01–5.0 percent by weight of an organic sulfimide, said composition being free from amines.

6. A sealant composition in accordance with claim 5, wherein said organic sulfimide is benzoic sulfimide.

References Cited in the file of this patent
UNITED STATES PATENTS

| | | |
|---|---|---|
| 2,542,578 | Rust et al. | Feb. 20, 1951 |
| 2,558,139 | Knock et al. | June 26, 1951 |
| 2,628,178 | Burnett et al. | Feb. 10, 1953 |
| 2,833,753 | Lal | May 6, 1958 |
| 2,895,950 | Krieble | July 21, 1959 |